US012674349B2

(12) United States Patent
Berres et al.

(10) Patent No.: US 12,674,349 B2
(45) Date of Patent: Jul. 7, 2026

(54) OPENING DEVICE

(71) Applicant: Kiekert Aktiengesellschaft, Heiligenhaus (DE)

(72) Inventors: Michael Berres, Cologne (DE); Bernhard Drost, Isselburg (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 0 days.

(21) Appl. No.: 19/099,894

(22) PCT Filed: Jul. 21, 2023

(86) PCT No.: PCT/EP2023/070353
§ 371 (c)(1),
(2) Date: Jan. 30, 2025

(87) PCT Pub. No.: WO2024/033062
PCT Pub. Date: Feb. 15, 2024

(65) Prior Publication Data
US 2026/0043286 A1 Feb. 12, 2026

(30) Foreign Application Priority Data
Aug. 8, 2022 (DE) ..................... 10 2022 119 851.0

(51) Int. Cl.
*E05F 15/619* (2015.01)

(52) U.S. Cl.
CPC ....... *E05F 15/619* (2015.01); *E05Y 2201/618* (2013.01); *E05Y 2201/716* (2013.01); *E05Y 2201/722* (2013.01); *E05Y 2900/531* (2013.01)

(58) Field of Classification Search
None
See application file for complete search history.

(56) References Cited

U.S. PATENT DOCUMENTS 5,036,620 A * 8/1991 Beran ................... E05F 1/1207 49/141
9,995,066 B1 * 6/2018 Ottolini ................. E05F 15/619
(Continued)

FOREIGN PATENT DOCUMENTS

CN 106050047 A * 10/2016 ........... F25D 23/028
DE 102011015669 A1 10/2012
(Continued)

OTHER PUBLICATIONS

International Search Report mailed Sep. 25, 2023, for International Application No. PCT/EP2023/070353.

*Primary Examiner* — Catherine A Kelly
(74) *Attorney, Agent, or Firm* — Renner, Otto, Boisselle & Sklar, LLP

(57) ABSTRACT

The invention relates to an opening device for a motor vehicle door, in particular a handle-free motor vehicle door such as, for example, a handle-free motor vehicle side door. For this purpose, the opening device has an electromotive drive (1 to 4) and an associated actuator (5) for acting on a door leaf. The actuator (5) acts on the door leaf with a travel-dependent force along its actuating travel(S). According to the invention, the electromotive drive (1 to 4) acts on the actuator (5) with the interposition of a rack-and-pinion gear (7, 8), wherein the rack-and-pinion gear (7, 8) operates with different transmission ratios on the actuator (5) along its actuating travel(S).

12 Claims, 3 Drawing Sheets

(56) References Cited

U.S. PATENT DOCUMENTS

| | | | | |
|---|---|---|---|---|
| 10,301,865 | B2 * | 5/2019 | Son | E05F 15/614 |
| 10,711,503 | B2 * | 7/2020 | Linden | B60R 13/043 |
| 10,801,245 | B2 * | 10/2020 | Cumbo | F16H 55/26 |
| 11,029,078 | B2 * | 6/2021 | Lee | F25D 23/028 |
| 11,505,980 | B2 * | 11/2022 | Aceto | E05F 15/649 |
| 12,173,546 | B2 * | 12/2024 | Reddmann | E05F 15/619 |
| 12,421,770 | B2 * | 9/2025 | Szegeny | E05B 81/06 |
| 2015/0240548 | A1 * | 8/2015 | Bendel | E05F 5/00 701/49 |
| 2016/0033024 | A1 * | 2/2016 | Yulkowski | E05F 3/102 16/64 |
| 2016/0242542 | A1 * | 8/2016 | Friesenecker | E05F 15/63 |

FOREIGN PATENT DOCUMENTS

| | | | | | |
|---|---|---|---|---|---|
| DE | 102015103826 | A1 | | 9/2016 | |
| DE | 102018132665 | A1 | | 6/2020 | |
| DE | 102021131149 | A1 | | 6/2023 | |
| FR | 2814771 | A1 | | 4/2002 | |
| WO | 2020125850 | A1 | | 6/2020 | |
| WO | WO-2021223792 | A1 | * | 11/2021 | E05F 7/04 |

* cited by examiner

OPENING DEVICE

This application is a national phase of International Application No. PCT/EP2023/070353 filed Jul. 21, 2023, which claims priority to German Application No. 10 2022 119 851.0 filed Aug. 8, 2022, each of which is hereby incorporated herein by reference in its entirety.

DESCRIPTION

Field of Disclosure

The invention relates to an opening device for a motor vehicle door, in particular a handle-free motor vehicle door such as a handle-free motor vehicle side door, with an electromotive drive, and with an associated actuator for acting on a door leaf, wherein the actuator acts on the door leaf with a travel-dependent force along its actuating travel. This means that the electromotive drive works on the associated actuator, with the aid of which the door leaf can be acted on.

Background of Disclosure

Opening devices for motor vehicle doors are known in a wide variety of designs and are propagated in the prior art and in practice. In fact, according to the explanations in DE 10 2015 103 826 A1, the relevant opening device ensures that, with its aid, the associated door leaf of the relevant motor vehicle door can be opened at least partially relative to a motor vehicle body. As a result, an operator or user of the motor vehicle subsequently has the possibility of grasping the door leaf through the gap created in this way and thereby pivoting and opening the door leaf about its pivot axis in the example case.

In principle, it is of course possible to equip not only pivotable motor vehicle side doors with such an opening device, but also to alternatively open a tailgate, a sliding door, etc., in this way. Alternatively, a front hood can also be equipped with such an opening device.

In any case, with a motor vehicle door equipped with the relevant opening device, an outer door handle or an outer grip is usually not necessary and the motor vehicle door can be designed to be particularly aerodynamically advantageous.

For this purpose, different embodiments of such opening devices are known in the prior art. For example, FR 2 814 771 A1 shows an opening device that, in the manner of a spindle drive, acts on a rod-shaped actuator, which can thus open and, if applicable, close a door leaf in the desired manner.

With another embodiment according to DE 10 2018 132 665 A1, the door leaf can be held with the aid of the actuator or actuating means. For this purpose, the actuator has a locking means or a locking lever. As a result, a form-fitting connection with the motor vehicle body can be provided.

With the generic prior art according to DE 10 2011 015 669 A1, a lifting element is provided which transfers the motor vehicle door or the associated door leaf by motor into the raised position by means of a pivot movement. For this purpose, the lifting element is equipped with a two-part design, consisting of an outer lever and an inner lever, which are pivotable relative to one another. Since the outer lever, for example, is equipped with an arc-shaped stop ring and moves with this against the door leaf in order to open it, the travel-dependent force along the actuating travel of the actuator is observed, with the aid of which the actuator acts on the door leaf.

The prior art has proven itself in principle, but still offers room for improvement. In fact, the structure of the generic teaching according to DE 10 2011 015 669 A1 is relatively complex and the frictional contact of the stop ring of the outer lever on the inside of a flap or motor vehicle door at this point leads, on the one hand, to damage to the motor vehicle door and, on the other hand, to increased abrasion on the stop ring. In addition, the interaction between the arc-shaped stop ring, on the one hand, and the door leaf acted on by it, on the other hand, takes up a relatively large amount of space for mutual interaction. This is counterproductive given that the installation space between the associated vehicle door and the motor vehicle body is usually limited, because the interior of the motor vehicle door, which usually accommodates the electromotive drive, is typically filled with other components such as side impact protection, window lifters, speakers, side airbags, etc.

SUMMARY OF DISCLOSURE

Accordingly, the present invention is based on the technical problem of further developing such an opening device for a motor vehicle door in such a way that a functional and structurally simple force application to the actuator is achieved.

To solve this technical problem, a generic opening device for a motor vehicle door is characterized within the framework of the invention in that the electromotive drive acts on the actuator with the interposition of a rack-and-pinion gear, wherein the rack-and-pinion gear works with different transmission ratios on the actuator along its actuating travel.

For this purpose, the rack-and-pinion gear is usually equipped with a nautilus-shaped pinion that engages with a gear rack. The engagement between the pinion and the relevant gear rack can advantageously be formed as an involute gearing.

Such an involute gearing is characterized by a gear profile with which the contact points of two intermeshing tooth flanks move in a straight line during the entire engagement. As a result, such involute gearings are relatively insensitive in relation to changes in the center distance. Accordingly, any position tolerances of the bearing points or even a deviating concentricity have little effect, so that such an involute gearing is ideally suited for robust applications in connection with such opening devices.

In most cases, the nautilus-shaped pinion defines a rolling curve with a radius that grows along the actuating travel of the actuator. In order to take into account this growing radius of the rolling curve of the nautilus-shaped pinion, the gear rack engaging with it is inclined relative to the pinion and consequently also to the actuator. The angle of inclination is adapted to the growth of the radius of the pinion.

This means that the rack is inclined so that the nautilus-shaped pinion with its growing radius in comparison to the axis of the pinion remains engaged with the gear rack without jamming over the entire actuating travel of the actuator. In addition, the actuator is usually connected to the gear rack.

In this way, during the movement of a pinion, the gear rack engaging with the nautilus-shaped pinion performs a movement in the direction specified by the angle of inclination, which typically corresponds to a linear movement of the actuator connected to the gear rack. As a result, the actuator can be transferred 10 from an end position, for example in a retracted state relative to a housing, to another end position, which corresponds to an exposed position of the actuator relative to the housing. Of course, it is also possible to move the actuator back into the retracted position. The housing accommodates the entire opening device according to the invention in its interior and ensures a sealed accommodation, except for an opening through which the actuator passes. As a result, the actuator can be transferred into the two end positions described.

In addition, the nautilus-shaped pinion is usually connected to a gear wheel of a gear of the electromotive drive. This gear is usually a reduction gear, with the aid of which the rapidly moving rotations of the output shaft of an electric motor, as a component of the electromotive drive, are converted into slower rotations of the relevant gear wheel and, consequently, the nautilus-shaped pinion.

The actuator is usually designed as an adjusting slide that can be acted on linearly. A linear guide is provided inside the housing for supporting the adjusting slide in or opposite the housing. As a result, the actuator or the linearly movable adjusting slide can be easily moved relative to the motor vehicle body, thus ensuring the desired actuating movement of the door leaf relative to the motor vehicle body.

All of this is achieved with consideration for a particularly functional and compact structure. The functional design is achieved in that, with the aid of the nautilus-shaped pinion, starting from the retracted end position of the actuator inside the housing, the actuator or the linearly movable adjusting slide is initially acted on by a high torque while taking into account a small portion of the entire actuating travel. As a result, the adjusting slide or actuator can apply great force or high transmission ratios to the door leaf at the beginning of the actuating travel, so that it is possible to ultimately detach the door leaf acted on from, for example, a circumferential door rubber seal, even if the motor vehicle door is frozen to the motor vehicle body.

As the actuating travel increases, a reduced force is now required for acting on the door leaf, which corresponds to smaller transmission ratios of the nautilus-shaped pinion relative to the engaged gear rack or the rack-and-pinion gear as a whole. This is accompanied by a lower force acting on the door leaf and at the same time the majority of the actuating travel of the actuator is completed, with an increased speed at the same time. In contrast, the rack-and-pinion gear works with its largest transmission ratios at the beginning of the actuating movement of the actuator, starting from the retracted end position, in order to—as described-break any ice formations.

Due to the nautilus-shaped pinion and the associated increase in the radius of the rolling geometry in comparison to the axis of the nautilus-shaped pinion, it results, as a whole and as desired, in the door leaf being acted on by a force that is travel-dependent along its actuating travel, initially large and then continuously decreasing.

All this is achieved by taking into account a compact structure, which in this way finds its place inside the housing in a protected and sealed manner. As a result, the opening device can, as a whole, fit inside the motor vehicle door, even taking into account the narrow space or restricted installation space that is usually present there. Due to the encapsulated structure, the installation in the wet area of the motor vehicle door is also possible. These are the main advantages.

BRIEF DESCRIPTION OF DRAWINGS

In the following, the invention is explained in more detail with the aid of a drawing showing only an exemplary embodiment; in the figures.

DETAILED DESCRIPTION

The figures show an opening device for a motor vehicle door. In fact, the opening device in question is located inside a motor vehicle door, and for this purpose, it can be installed close to the axis, in comparison to a pivot axis of a motor vehicle side door, as is described in detail in the previously referenced DE 10 2015 103 826 A1. For this purpose, the opening device has an electromotive drive 1, 2, 3, 4, which can be understood based on the specific representation in FIG. 3.

With the aid of the electromotive drive 1 to 4, an associated actuator 5 is acted on in order to position a door leaf as a component of the motor vehicle side door (not expressly shown) opposite the associated motor vehicle body. The actuator 5 acts on the door leaf with a travel-dependent force along its actuating travel S.

Figure 1:
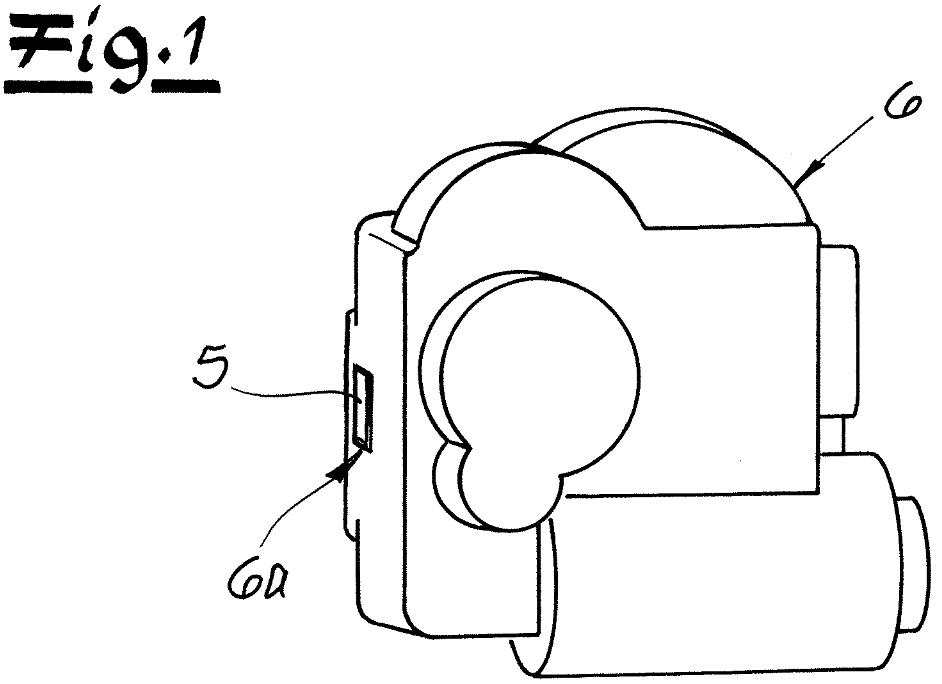
FIG. 1 is an overview of the opening device according to the invention, FIG. 2A und 2B show different functional positions of the opening device in detail
Figure 1:
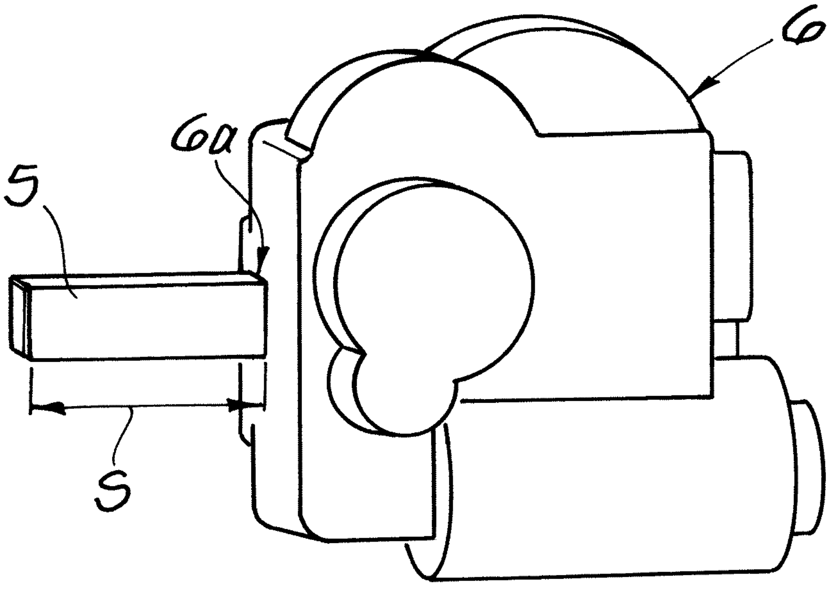

It can be seen based on a comparison of the upper and lower representations in FIG. 1 that the actuator 5 can be moved along the actuating travel S, starting from a first end position shown in the upper part of FIG. 1 or a retracted position relative to a housing 6 into an exposed second end position, as shown in the lower part of FIG. 1. The housing 6 is formed to be closed as a whole and completely accommodates the opening device shown in detail in FIGS. 2A, 2B and 3. An opening 6*a* in the housing 6 ensures that thereby the actuator 5 can be moved back and forth from one end position to the other through it. The opening device accommodated inside the housing 6 can thus be installed in the wet area of the motor vehicle door and in particular the motor vehicle side door equipped therewith.

Figure 2A:
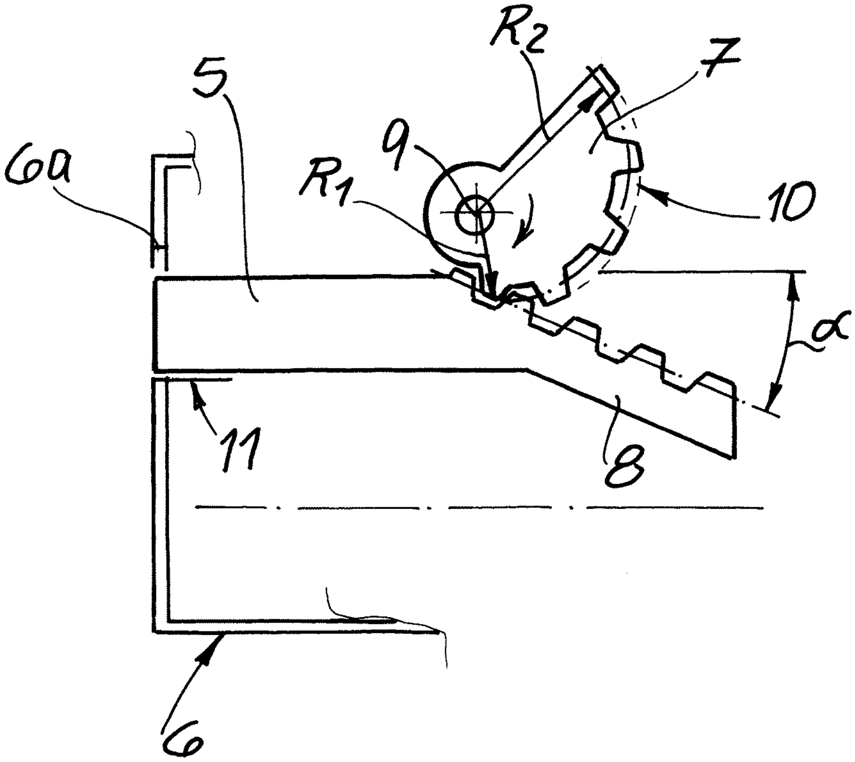
Figure 2B:
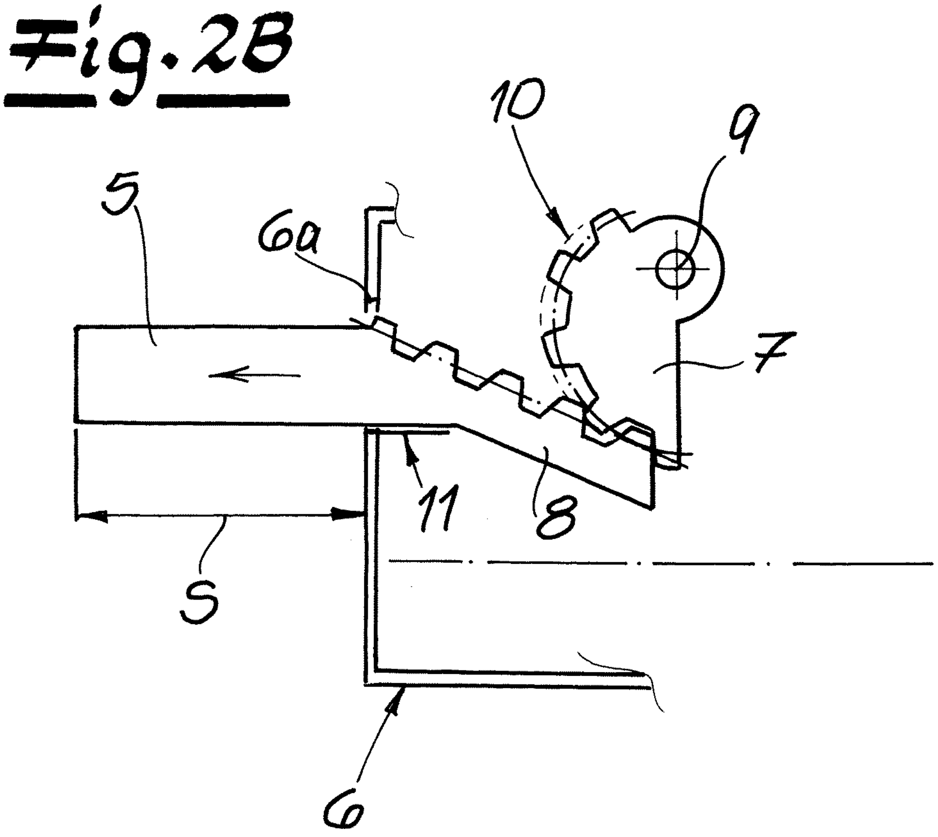
Figure 3:
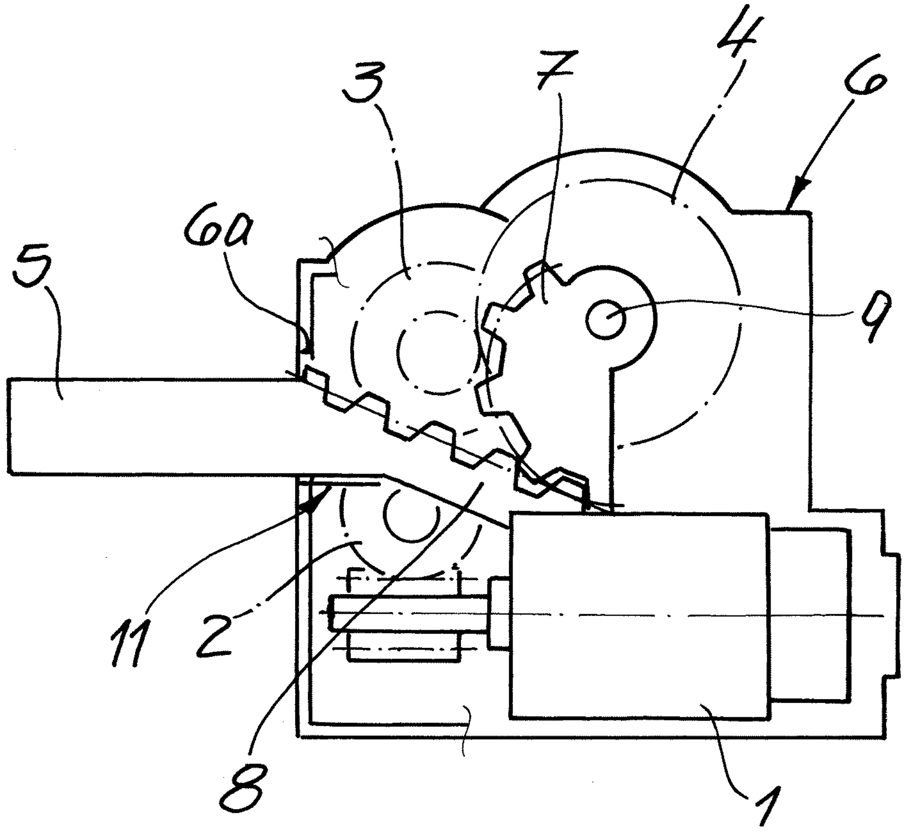
FIG. 3 is a specific embodiment variant.

Based on FIGS. 2A, 2B and 3, it is clear that the electromotive drive 1 to 4 acts on the actuator 5 with the interposition of a rack-and-pinion gear 7, 8. The rack-and-pinion gear 7, 8 operates with different transmission ratios on the actuator 5 along its actuating travel S, as will be explained in more detail below. For this purpose, the rack-and-pinion gear 7, 8 in its basic structure initially has a nautilus-shaped pinion 7, which engages with a gear rack 8.

An involute gearing is provided at this point between the pinion 7 and the gear rack 8, as already described in the introduction.

The nautilus-shaped pinion 7 can be pivoted as a whole about an axis 9. The pivot movement of the nautilus-shaped pinion 7 is provided by a gear wheel 4, to which the nautilus-shaped pinion 7 is connected, as can be understood based on FIG. 3.

For this purpose, the gear wheel 4 is designed as a component of a gear 2, 3, 4 of the electromotive drive 1 to 4. In fact, the electromotive drive 1 to 4 consists of an electric motor 1 and the gear 2, 3, 4 in question, which according to the exemplary embodiment is formed as a reduction gear 2, 3, 4. In this way, the rapidly rotating movements of the output shaft of the electric motor 1 are reduced to the comparatively slow rotations of the output-side gear or gear wheel 4.

The nautilus-shaped pinion 7 defines a rolling curve 10 that can be understood in particular based on FIGS. 2A and 2B, which is described by the fact that the nautilus-shaped pinion 7 is equipped with a radius $R_1$, $R_2$, which increases from an initial value of the radius $R_1$ to a final value of the radius $R_2$ along the rolling curve 10 described in this way. In this way, the rolling curve 10 and with it the pinion 7 are formed to be nautilus-shaped and, according to the exemplary embodiment, are designed as a whole as a circular arc segment.

It can be seen that the rolling curve 10 has a growing radius along the actuating travel S of the actuator 5, which rises from the initial value $R_1$ to the final value $R_2$. With this growing radius or the nautilus-shaped rolling curve 10, the nautilus-shaped pinion 7 works on a gear rack 8. So that no jamming occurs at this point in the particular gearing of the pinion 7 on the one hand and the gear rack 8 on the other hand, in this exemplary embodiment the gear rack 8 is inclined relative to the pinion 7 and also to the actuator 5, which is usually moved back and forth linearly. A corresponding angle α of inclination takes into account the growth of the radius of the nautilus-shaped pinion 7 or is adapted to it. That is, depending on the difference between the initial radius $R_1$ and the finally achieved radius $R_2$, the angle α of inclination of the gear rack 8 is also dimensioned accordingly in order to ensure an even engagement of the respective gearings.

In this way, the actuator 5 as a whole is designed as a linearly movable adjusting slide 5. In fact, for this purpose, the housing 6 has a linear guide 11 inside it, with the aid of which the adjusting slide 5 can be moved linearly along its actuating travel S from one end position to the other and back.

This process can best be understood by comparing FIGS. 2A and 2B. In FIG. 2A, the adjusting slide 5 is in its retracted end position, as it corresponds to the upper representation in FIG. 1. If, starting from this end position, the nautilus-shaped pinion 7 is pivoted about its axis 9 in a clockwise direction with the aid of the electromotive drive 1 to 4, the outer peripheral gearing of the nautilus-shaped pinion 7 ensures that the gear rack 8 is increasingly moved obliquely in accordance with its inclination, taking into account the angle α.

During this process, the nautilus-shaped pinion 7 with the initial radius $R_1$ works on the gear rack 8, so that the gear rack 8 and the connected adjusting slide 5 are acted on by high transmission ratios and a small adjusting travel, and consequently to a large force. This large force is required at the beginning of the opening process, for example in order to detach the door leaf from a surrounding rubber seal, even in the frozen state of the motor vehicle door, for example.

With the increasing movement of the nautilus-shaped pinion 7, the radius now grows until the value $R_2$ is reached at the end of the actuating travel S. This is accompanied by a reduction in the transmission ratios and an enlargement in the portion of the actuating travel S and an increased adjustment speed of the adjusting slide 5. This is continued until the functional position according to FIG. 2B is reached, which corresponds to the lower representation in FIG. 1, in which the adjusting slide 5 has assumed its exposed position relative to the housing 6.

The invention claimed is:

1. An opening device for a motor vehicle door including a door leaf, the opening device comprising:

an electromotive drive, a rack-and-pinion gear, and an actuator for acting on the door leaf, wherein the actuator acts on the door leaf with a travel-dependent force along an actuating travel, wherein the electromotive drive acts on the actuator with interposition of the rack-and-pinion gear, wherein the rack-and-pinion gear operates with different transmission ratios on the actuator along the actuating travel, wherein the rack-and-pinion gear has a nautilus-shaped pinion and a gear rack, and wherein the nautilus-shaped pinion defines a rolling curve with a radius that continually grows along the actuating travel of the actuator.

2. The opening device according to claim 1, wherein an engagement is formed between the nautilus-shaped pinion and the gear rack.

3. The opening device according to claim 2, wherein the engagement between the nautilus-shaped pinion and the gear rack is formed as an involute gearing.

4. The opening device according to claim 2, wherein the gear rack is inclined relative to the nautilus-shaped pinion.

5. The device according to claim 4, wherein an angle of inclination of the gear rack is adapted to a growth of the radius of the nautilus-shaped pinion as the radius grows along the actuating travel of the actuator.

6. The opening device according to claim 4, wherein the gear rack is configured to move in a direction of the inclination relative to the nautilus-shaped pinion.

7. The opening device according to claim 1, wherein the actuator is connected to the gear rack.

8. The opening device according to claim 1, wherein the electromotive drive includes a gear with a gear wheel, and wherein the nautilus-shaped pinion is connected to the gear wheel of the gear.

9. The opening device according to claim 8, wherein the gear is formed as a reduction gear.

10. The opening device according to claim 1, wherein the actuator is designed as a linearly movable adjusting slide.

11. The opening device according to claim 10, further comprising a housing including a linear guide configured to support the adjusting slide.

12. The opening device according to claim 11, wherein the housing is sealed such that the housing is configured to perform a wet installation.

* * * * *